United States Patent

Shibata

[19]

[11] Patent Number: 5,966,718
[45] Date of Patent: Oct. 12, 1999

[54] DOCUMENT PROCESSING SYSTEM WITH ENABLE FEATURE

[75] Inventor: Takao Shibata, Kanagawa, Japan

[73] Assignee: Fuji Xerox Co., Ltd., Tokyo, Japan

[21] Appl. No.: 08/634,833

[22] Filed: Apr. 19, 1996

[30] Foreign Application Priority Data

Apr. 20, 1995 [JP] Japan .................................. 7-117737

[51] Int. Cl.$^6$ .................................................. G06K 9/54
[52] U.S. Cl. ............................................................ 707/530
[58] Field of Search .................................. 707/530, 526, 707/911, 531, 524, 517, 521

[56] References Cited

U.S. PATENT DOCUMENTS

| | | | |
|---|---|---|---|
| 5,341,293 | 8/1994 | Vertelney et al. | 364/419.17 |
| 5,511,148 | 4/1996 | Wellner | 395/106 |
| 5,513,306 | 4/1996 | Mills et al. | 395/148 |
| 5,535,322 | 7/1996 | Hecht | 395/155 |
| 5,706,452 | 1/1998 | Ivanov | 395/331 |

FOREIGN PATENT DOCUMENTS 2-129760 5/1990 Japan .
3-110666 5/1991 Japan .
4-357551 12/1992 Japan .

*Primary Examiner*—Stephen S. Hong
*Assistant Examiner*—Alford W. Kindred
*Attorney, Agent, or Firm*—Finnegan, Henderson, Farabow, Garrett & Dunner, L.L.P.

[57] ABSTRACT

In a document processing system which performs document processing such as edit and display for document data, a plurality of preset document roles are stored in role definition section, a plurality of preset document processing scenes are stored in scene definition section, information indicating whether or not document processing is enabled corresponding to a pair of a role and a scene is stored in operation definition section, and event processing section gets the corresponding role from the role definition section and the corresponding scene from the scene definition section based on document processing information entered through an input section and gets information indicating whether or not the corresponding document processing such as edit or display is enabled from the operation definition section. The event processing section causes document processing sections to execute document processing of the document to be processed, based on the gotten information indicating whether or not the document processing is enabled.

4 Claims, 15 Drawing Sheets

FIG. 13

ROLE STORAGE SECTION — 13

| BACKGROUND | PLANNING | GENERAL AFFAIR | EXECUTIVES |
|---|---|---|---|

AREA STORAGE SECTION — 14

| AREA | ROLE |
|---|---|
| AREA 1 | 1 (BACKGROUND) |
| AREA 2 | 1 (BACKGROUND) |
| AREA 3 | 1 (BACKGROUND) |
| AREA 4 | 2 (PLANNING) |
| AREA 5 | 2 (PLANNING) |
| AREA 6 | 3 (GENERAL AFFAIRS) |
| AREA 7 | 1 (BACKGROUND) |
| AREA 8 | 1 (BACKGROUND) |
| AREA 9 | 1 (BACKGROUND) |
| AREA 10 | 3 (GENERAL AFFAIRS) |
| AREA 11 | 4 (EXECUTIVES) |
| AREA 12 | 5 (EXECUTIVES) |

SCENE STORAGE SECTION — 16

| FORM PREPARATION | PLANNING ENTRY | GENERAL AFFAIR ENRTY | EXECUTIVE ENTRY | APPROVAL END |
|---|---|---|---|---|
| ENABLE 1 (BACKGROUND) | DISABLE UNDEFINED | DISABLE UNDEFINED | DISABLE UNDEFINED | DISABLE UNDEFINED |

OPERATION STORAGE SECTION — 19

| SCENE \ ROLE | FORM PREPARATION | PLANNING ENTRY | GENERAL AFFAIR ENTRY | EXECUTIVE ENTRY | APPROVAL END |
|---|---|---|---|---|---|
| BACKGROUND | ENABLE EDIT ENABLE DISPLAY | DISABLE EDIT ENABLE DISPLAY | DISABLE EDIT ENABLE DISPLAY | DISABLE EDIT ENABLE DISPLAY | DISABLE EDIT ENABLE DISPLAY |
| PLANNING | ENABLE EDIT ENABLE DISPLAY | ENABLE EDIT ENABLE DISPLAY | ENABLE EDIT ENABLE DISPLAY | DISABLE EDIT ENABLE DISPLAY | DISABLE EDIT ENABLE DISPLAY |
| GENERAL AFFAIR | ENABLE EDIT ENABLE DISPLAY | DISABLE EDIT ENABLE DISPLAY | ENABLE EDIT ENABLE DISPLAY | DISABLE EDIT ENABLE DISPLAY | DISABLE EDIT ENABLE DISPLAY |
| EXECUTIVE | ENABLE EDIT ENABLE DISPLAY | DISABLE EDIT ENABLE DISPLAY | DISABLE EDIT ENABLE DISPLAY | ENABLE EDIT ENABLE DISPLAY | DISABLE EDIT ENABLE DISPLAY |

5,966,718

DOCUMENT PROCESSING SYSTEM WITH ENABLE FEATURE

BACKGROUND OF THE INVENTION

This invention relates to a document processing system for document processing, such as editing and displaying electronic document data, and more particularly, to a document processing system for controlling enablement of document processing for a document or areas within a document.

Document processing systems which process electronic document data, such as wordprocessors and personal computers, are widely used for preparing documents. These document processing systems, require function regulating processing such as editing and displaying prepared document data, in addition to document preparation. For example, a document processing regulation function is required to prevent prepared document data from being edited in error as changes or deletions are made. In addition, these systems require the ability to display documents only for specific users in order to provide security of the document contents.

As a result, document processing systems with edit and display processing regulation functions for document data have been proposed.

A document processing system described in Japanese Patent unexamined Publication No.Hei 2-129760, hereinafter referred to as prior art 1, sets a specific area in a document and inhibits character deletion or change in the area thus preventing edit processing from accidentally being performed.

A document processing system described in Japanese Patent Unexamined Publication No.Hei 3-110666, hereinafter referred to as prior art 2, assigns a password to specific area of a document and prevents character deletion or change in the area unless the password is entered. Therefore, document data in the area can be edited only when the password is entered, thus preventing edit processing from accidentally being performed.

A document processing system described in Japanese Patent Unexamined Publication No.Hei 4-357551, hereinafter referred to as prior art 3, sets a specific area in a document and manages access for document edit or display in the area based on user or user group identifiers. Thus, document data in the area can be edited or displayed only by entering an identifier that is granted this access. This system prevents edit processing from accidentally being performed, or displaying the document to general users.

There is a need for document edit and display regulation that can change in response to a document's use state. In the document processing system of prior art 1, the area set in the document is always fixed to the edit processing inhibition state regardless of the use state, and if the inhibition state is to be changed, setting change processing must be performed each time. Thus, the document processing system cannot deal flexibly with the document's use state.

If different passwords are distributed to users, the document processing system of prior art 2 can to a certain extent regulate edit processing in response to the use state. However, if a password is assigned for each area of a document, the user must enter the password 10 different times to edit document data in 10 different areas. Thus, the user is forced to perform extremely cumbersome operations.

The document processing system of prior art 3 automatically determines whether or not the user has access to a specific area by his or her entered identifier, thus eliminating the need for the user to perform the cumbersome operations described above. However, to set access in each area of a document system during setting access, setting operations must be repeated 30 times for 30 areas. Thus, the system setting operation is extremely cumbersome.

Depending on the use state of a document, a user may want to add a new page or area to the document, where the document or area can be or combine, for example, text and/or graphics. Such new insertion of document pages or areas needs to be regulated like editing or displaying the document or area. The document processing systems of prior arts 1–3 can not cope with this situation.

SUMMARY OF THE INVENTION

It is therefore an object of the invention to provide a document processing system for a plurality of documents or areas, whose edit or display is regulated depending on the user, that simplifies setting and using the regulations.

It is a further object of the invention to provide a document processing system that if a document or area whose edit or display is regulated for a particular user is to be changed, permits the regulation to be easily set and used.

It is another object of the invention to provide a document processing system that if a document or area whose edit or display is regulated for a plurality of users is partially duplicated, permits the regulation to be easily set and used.

It is an additional object of the invention to provide a document processing system which permits the regulation to be easily set and used when inserting a new document page or area.

It is another object of the invention to provide a document processing system that provides security in editing and/or displaying the document.

To these ends, according to a first aspect of the invention, there is provided a document processing system which performs document processing such as edit and display for document data, the system comprising means for inputting document processing information, role definition means for storing a plurality of preset document roles, scene definition means for storing a plurality of preset document processing scenes, operation definition means for storing information indicating whether or not document processing is enabled corresponding to a pair of a role and a scene, event processing means for getting a role corresponding to a document to be processed from the role definition means and the corresponding scene from the scene definition means based on input document processing information and getting information indicating whether or not the corresponding document processing is enabled from the operation definition means, and means for executing document processing of the document to be processed based on the information indicating whether or not the document processing is enabled, gotten by the event processing means.

According to a second aspect of the invention, in the document processing system of the first aspect, the document processing means performs document edit processing, the scene definition means stores information indicating whether or not new insertion of a document is enabled corresponding to each scene, and the event processing means also gets the information indicating whether or not new insertion is enabled from the scene definition means for controlling new insertion of a document by the document processing means.

According to a third aspect of the invention, in the document processing system of the first or second aspect, user identification information is also entered through the input means, the scene definition means stores user identification information corresponding to each scene, and the event processing means determines whether or not the user identification information gotten from the scene definition means matches the user identification information entered through the input means for controlling document processing by the document processing means.

The concepts of the roles, scenes, and operation are as follows:

Since a document is used for a specific purpose, each page or area of the document has a role subordinate to the purpose. Since it is convenient to handle areas, etc., having the same role in a unified manner with respect to edit or display regulation, the roles are defined and managed in the role definition means in the invention. One or more roles are defined in the role definition means and one or more document pages or areas are related to one role. One area, etc., is not related to a plurality of roles.

Generally, a process for accomplishing a specific purpose can be subdivided into steps for accomplishing secondary purposes, which are referred to as scenes in the invention. The necessity for edit or display regulation of document pages or areas changes with a scene and the necessity for regulation for new insertion of an area, etc., also changes with a scene. In the invention, these scenes and whether or not new insertion is enabled in them are defined and managed in the role definition means. To enable new insertion, preferably a default value for defining the role of a newly inserted area, etc., is previously related to the information indicating whether or not new insertion is enabled and the role of a newly inserted area, etc., can quickly be managed by the role definition means.

If enabling or disabling edit processing and enabling or disabling display processing are related to each role and scene pair, edit or display regulation can be executed automatically and precisely in response to the document's purpose or situation. In the invention, operations such as enabling or disabling edit processing and enabling or disabling display processing are defined and managed in the operation definition means for each of all pairs of roles and scenes defined in the role definition means and the scene definition means.

According to the document processing system of the first aspect of the invention, as the user specifies one area of a document and enters document processing information for editing or displaying through the input means, the event processing means gets the role of the area from the role definition means and the corresponding scene from the scene definition means, and also gets information from the operation definition means corresponding to the role and scene pair indicating whether or not edit or display processing is enabled.

If the information retrieved by the event processing means indicates edit or display processing is enabled, the document processing means permits edit or display processing of the specified document area in accordance with the document processing information. On the other hand, if the information gotten by the event processing means indicates edit or display processing is disabled, the document processing means does not permit edit or display processing of the specified document area, thus preventing the document area from being edited in error, and/or providing security for the document area.

According to the document processing system of the second aspect of the invention, if the document processing information entered through the input means indicates new insertion processing of a document area, the event processing means also gets information corresponding to the scene from the scene definition means indicating whether or not new insertion is enabled. If the information gotten by the event processing means indicates that new insertion processing is enabled, then the document processing means performs new insertion processing of the document area in accordance with the entered document processing information. On the other hand, if the information gotten by the event processing means indicates that new insertion processing is disabled, the document processing means does not permit new insertion processing of the document area, thus preventing the document area from being edited in error.

According to the document processing system of the third aspect of the invention, if user identification information such as a password or identifier previously assigned to each user or user group is entered together with document processing information through the input means, the event processing means gets the user identification information from the scene definition means, and determines whether or not the entered user identification information matches the user identification information set in the system. If they match, the document processing means performs document processing such as edit or display in accordance with the entered document processing information. On the other hand, if they do not match, the document processing means does not permit document processing, preventing the document area from being displayed to unspecified persons, and thus providing security for the document area.

BRIEF DESCRIPTION OF THE DRAWINGS

FIG. 13 is an illustration showing another example of the storage contents of the role storage section, an area storage section, the scene storage section, and the operation storage section;

DETAILED DESCRIPTION OF THE PREFERRED EMBODIMENTS

Referring now to the accompanying drawings, preferred embodiments of the invention will be described.

A first embodiment of the invention will be discussed, wherein editing and displaying an area set in a document are regulated to prevent accidental editing or displaying of the area. The embodiment where only specific users are permitted to edit and display an area or document, thus providing security, will be discussed in another embodiment.

Figure 1:
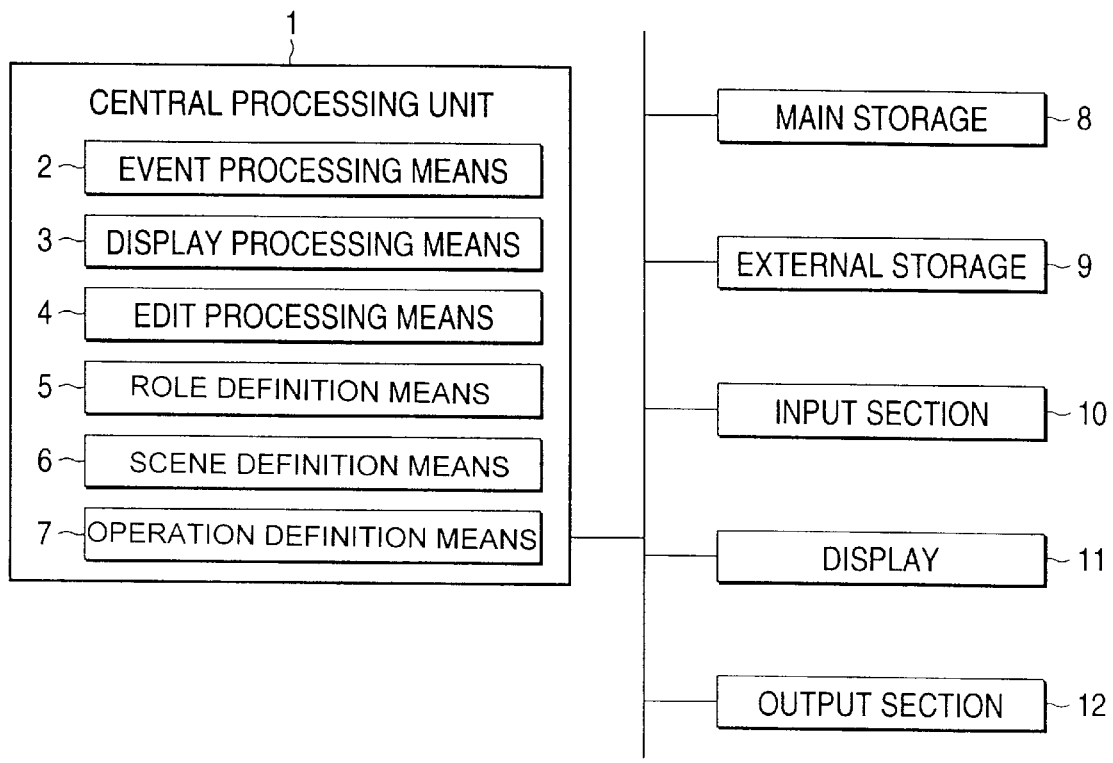
FIG. 1 is a block diagram showing the configuration of a document processing system according to a first embodiment of the invention.

As shown in FIG. 1, a document processing system according to the first embodiment of the invention comprises: a central processing unit 1 for controlling, based on a document processing control program system, components 8–12 connected to a bus; a main storage 8 comprising a readable/writable memory, such as RAM, for storing the document processing control program and functioning as a work area of the central processing unit 1; an external storage 9 comprising a readable/writable memory, such as a hard disk drive, functioning as a permanent storage of electronic document data prepared; an input section 10 for the user to input document processing information containing information of characters, coordinates, etc., to the central processing unit 1 as a document processing command event; a display 11 provided with a display screen for displaying user interface elements such as windows and cursors and a document image; and an output section 12 provided with a printer for printing out a document and communication means for transferring document data to external systems.

The central processing unit 1 comprises event processing means 2, display processing means 3, edit processing means 4, role definition means 5, scene definition means 6, and operation definition means 7 for performing edit or display processing based on a predetermined determination result for a document processing command event that is input through the input section 10.

The event processing means 2 receives a document processing command event input through the input section 10 and inquires of the role definition means 5, the scene definition means 6, and the operation definition means 7 whether or not document processing specified by the event is enabled. If it is enabled, the event processing means 2 commands the display processing means 3 or the edit processing means 4 to perform predetermined processing.

The display processing means 3 performs display processing of a specified document area based on a command from the event processing means 2 and displays the area on the display screen of the display 11.

The edit processing means 4 performs edit processing for a specified document area based on a command from the event processing means 2 and performs processing for deleting or changing description content data in the area.

Figure 2:
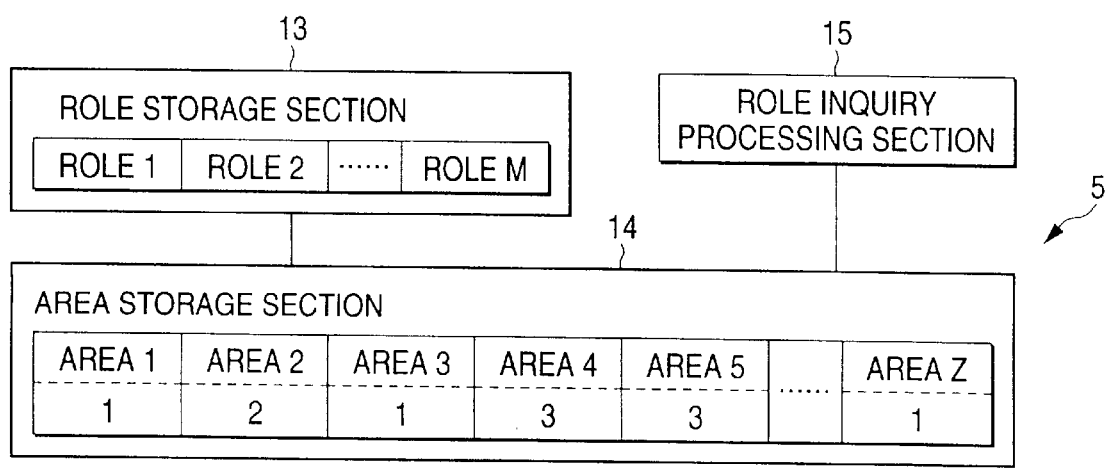
FIG. 2 is a conceptual drawing showing the configuration of a role definition means.

The role definition means 5 can define and manage preset roles for each document area and respond to a role inquiry from the event processing means 2 with the corresponding role. It comprises a role storage section 13, an area storage section 14, and a role inquiry processing section 15, as shown in FIG. 2.

The role storage section 13 stores preset M role information pieces in a variable-length array with one role as one array element. The area storage section 14 relates roles to Z areas set in a document and stores the information in a variable-length array with a pair of one area and a value indicating one role in the role storage section 13 as one array element. The role inquiry processing section 15 responds to an inquiry from the event processing means 2 with the role of the area about which the inquiry is made.

Figure 3:
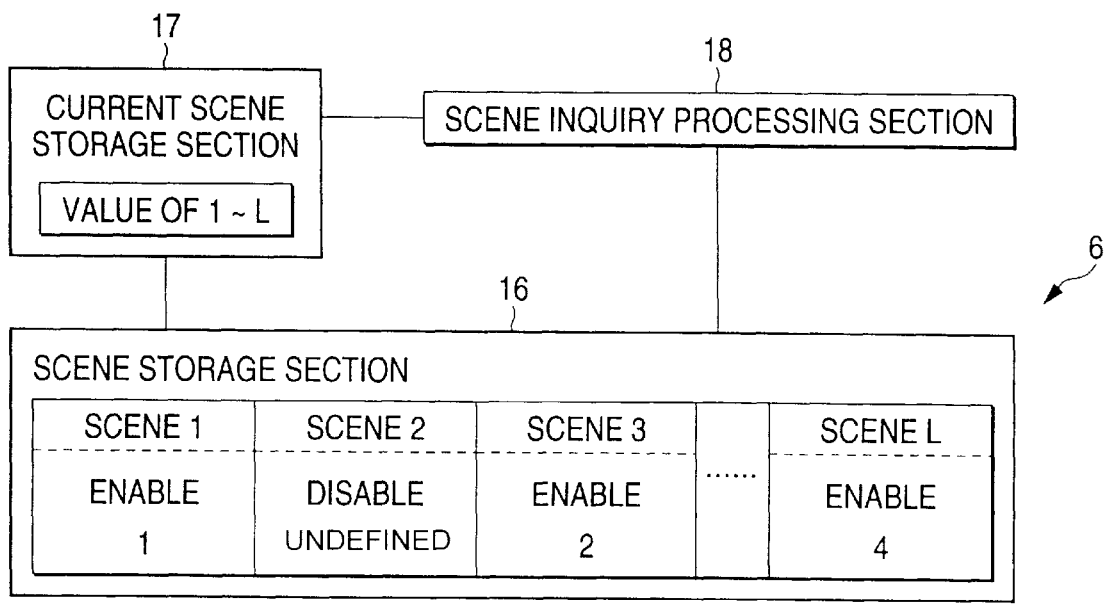
FIG. 3 is a conceptual drawing showing the configuration of a scene definition means.

The scene definition means 6 can define and manage preset scenes and respond to a role inquiry from the event processing means 2 with the corresponding scene. It comprises a scene storage section 16, a current scene storage section 17, and a scene inquiry processing section 18, as shown in FIG. 3.

The scene storage section 16 stores L preset scene information pieces in a variable-length array with one scene as one array element.

In the embodiment, information as to whether or not edit processing for new insertion of a document area is enabled for regulation is preset and also stored in the scene storage section 16 in relation to each scene. A value pointing to one element of the role storage section 13 as a default value is added to the new insertion enabling or disabling information, whereby the role of a newly inserted area is set and role information concerning the area is additionally stored in the area storage section 14. If new insertion is disabled, the value pointing to one element of the role storage section 13 is undefined.

If regulation of new insertion as described above is not executed, a preset scene list is stored in the scene storage section 16.

The current scene storage section 17 holds the value indicating one element stored in the scene storage section 16 and the scene inquiry processing section 18 responds to an inquiry from the event processing means 2 with the scene information held in the current scene storage section 17.

The element held in the current scene storage section 17 is set, for example, by the user who inputs a scene together with a document processing command event through the input section 10 for performing document processing, or when document data is transferred to other personal computers for sending a circular round to them, the element is automatically set in response to the circular round scene.

Figure 4:
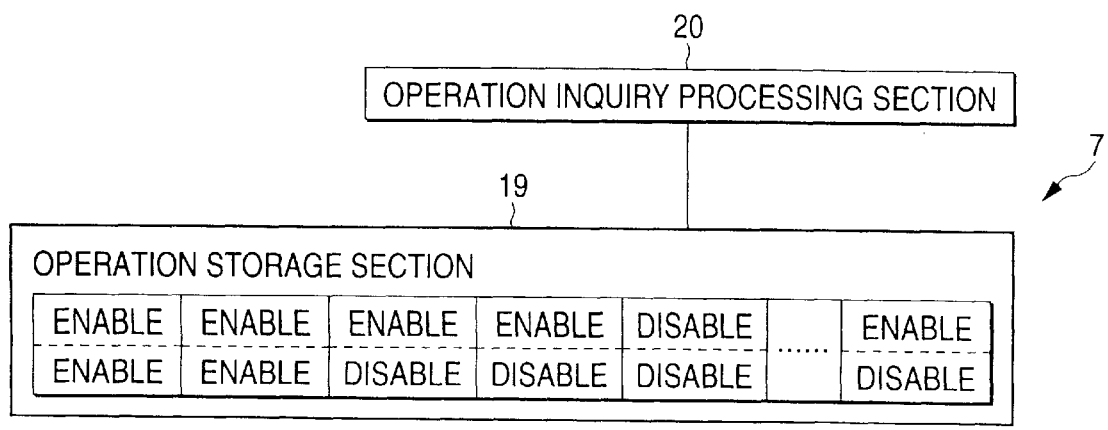
FIG. 4 is a conceptual drawing showing the configuration of an operation definition means.

The operation definition means 7 can define and manage preset operations for each role and scene pair and respond to a role inquiry from the event processing means 2 with the corresponding operation. It comprises an operation storage section 19 and an operation inquiry processing section 20, as shown in FIG. 4.

The operation storage section 19 stores operation information containing information as to whether or not edit processing is enabled and information as to whether or not display processing is enabled in a variable-length array with one information pair as one array element, where an information pair is a role and a corresponding scene. Assuming that the number of elements in the scene storage section 16 is L and that the number of elements in the role storage section 13 is M, the number of operation information piece pairs stored in the operation storage section 19 is the product of L and M; the operation information pieces pairs become elements of the matrix of roles and scenes.

The operation inquiry processing section 20 responds to an inquiry from the event processing means 2 with the operation information corresponding to the role and scene about which the inquiry is made.

Next, processing of the document processing system having the configuration will be discussed with reference to flowcharts.

Figure 5:
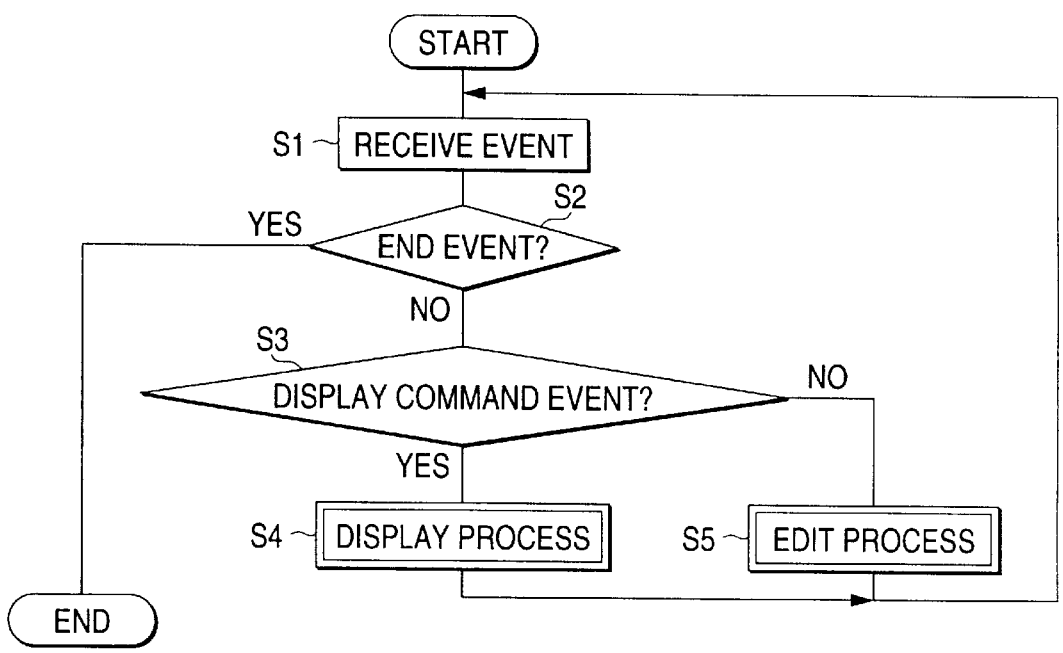
FIG. 5 is a flowchart showing a main process procedure executed by an event processing means.

First, when the document processing system is started, as shown in FIG. 5, the event processing means 2 monitors an input from the input section 10 and when receiving any event at step S1, determines whether or not the event is an end command at step S2 and if it is an end event, terminates the process. On the other hand, if it is not an end event but a document processing command event, the event processing means 2 determines whether it is a display or edit processing command event at step S3, and based on the determination result, executes a display command transmission process to the display processing means 3 at step S4 or an edit command transmission process to the edit processing means 4 at step 5.

Figure 6:
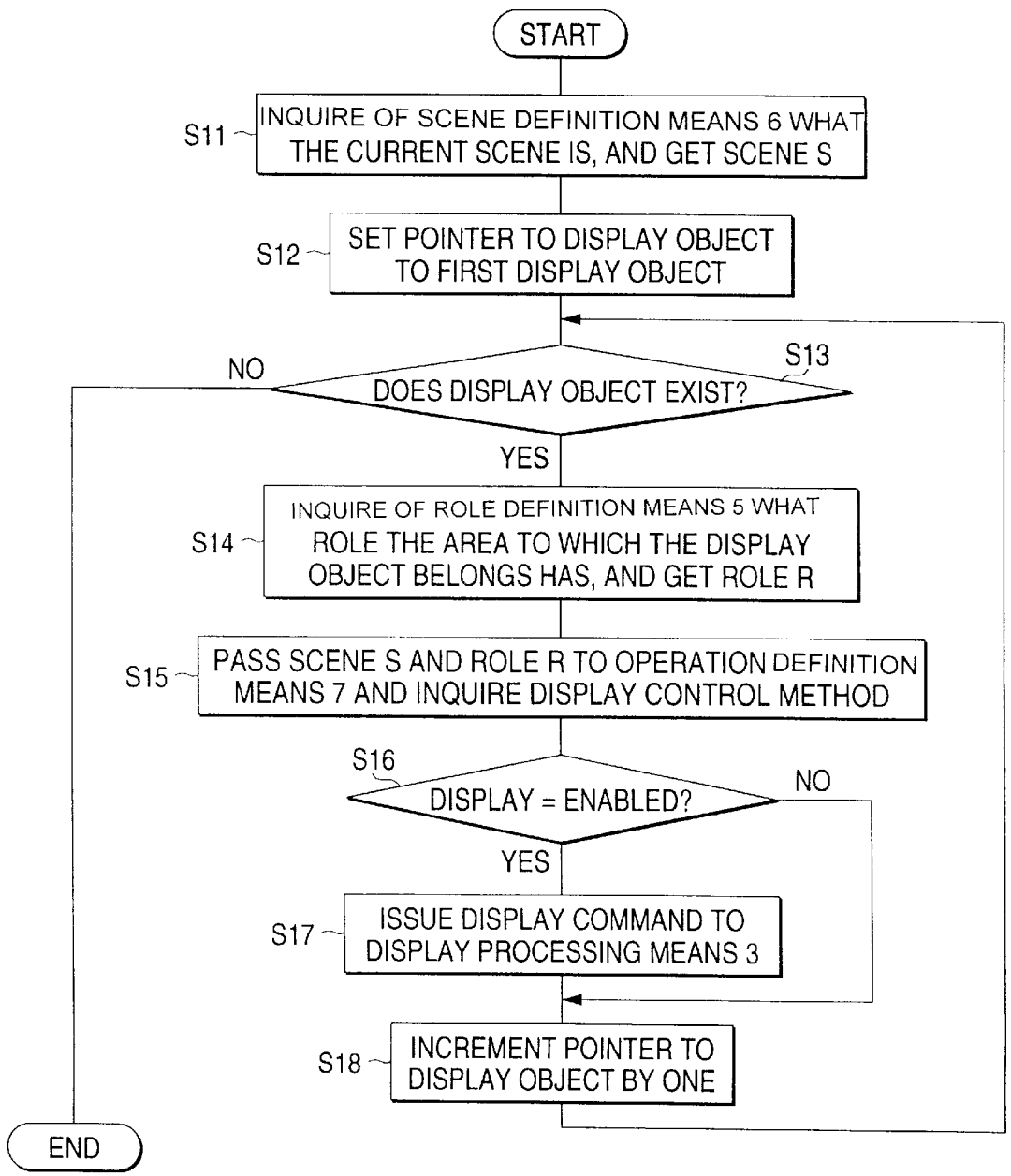
FIG. 6 is a flowchart showing a display processing determination procedure executed by an event processing means.

The event processing means 2 executes the display command transmission process at step S4 according to a procedure shown in FIG. 6. The embodiment assumes that any portion of a document belongs to any one area.

When receiving the display command event, the event processing means 2 inquires of the scene definition means 6 what the current scene is, and gets the current scene information read by the scene inquiry processing section 18 from the current scene storage section 17 at step S11. Next, the event processing means 2 sets a pointer pointing to the display object (in the embodiment, one of Z areas set in a document) to the first display object of the main storage 8 storing the document data to be processed at step S12, and repeats the following process loop of steps S13–S18 for all display objects at step S13.

That is, if one display object exists, the event processing means 2 specifies the area as the display object and inquires of the role definition means 5 what the role is, then gets the role information corresponding to the area read by the role inquiry processing means 15 from the role storage section 13 at step S14.

Next, the event processing means 2 passes the current scene information and the role information of the area as the display object to the operation definition means 7 and inquires a display control method for the area, then gets the operation information about display control from the operation inquiry processing means 20 that gets it from the operation storage section 19 at step S15.

Next, the event processing means 2 determines whether or not the gotten operation information indicates enabling display processing at step S16 and if enabling display is indicated, transmits a display command to the display processing means 3 at step S17 for commanding the display processing means 3 to perform display processing for displaying the object area on the display screen of the display 11. If the operation information indicates disabling display or the display command transmission is completed, the event processing means 2 increments the pointer pointing to the display object by one at step S18 and continues processing for the next area in the document.

That is, whether or not display processing is enabled is determined in response to the role and scene for each area set in the document and if there is a chance that erroneous operation will occur based on the role information, scene information, and operation information, the corresponding area is not displayed on the display 11.

Figure 7:
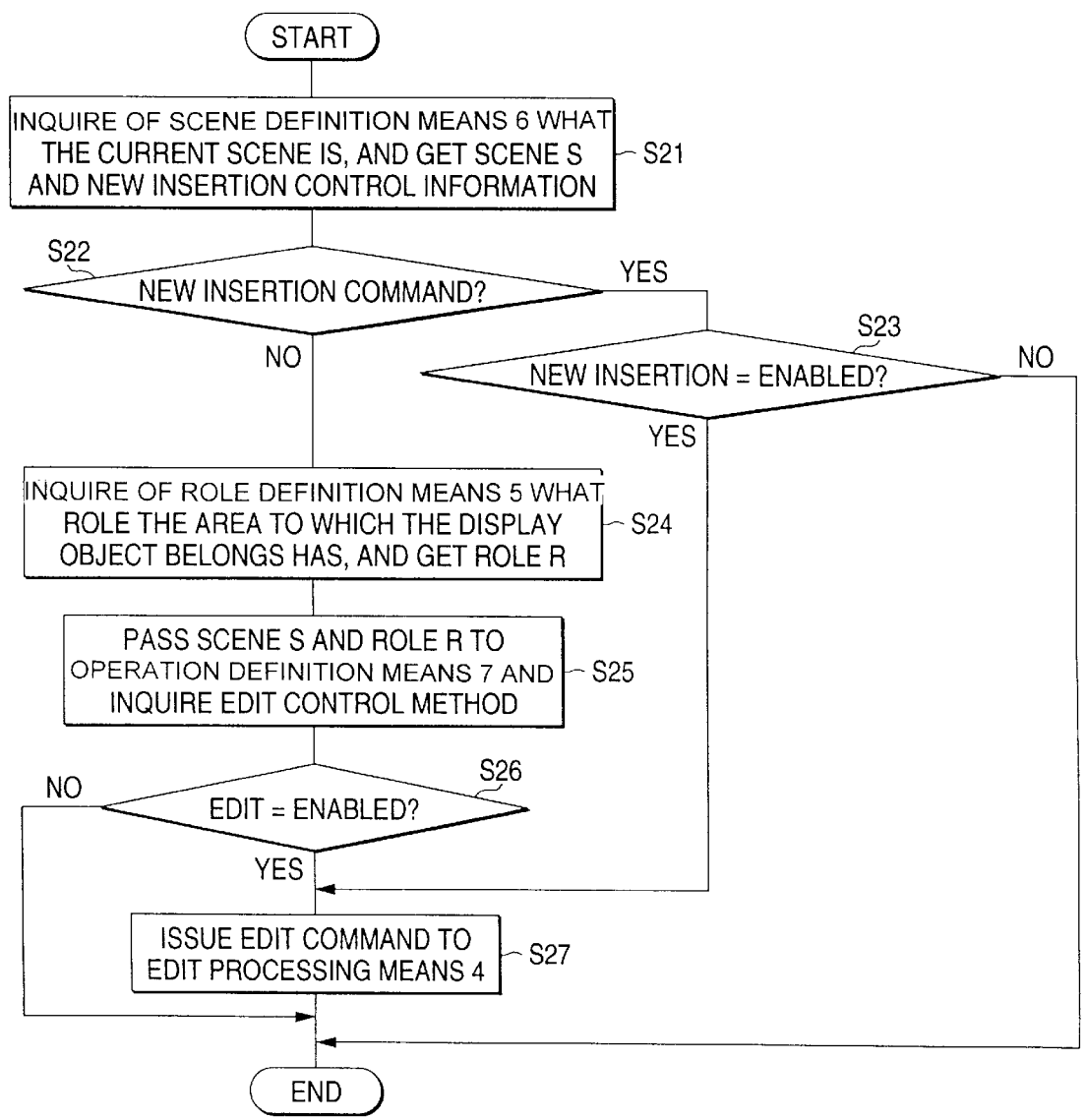
FIG. 7 is a flowchart showing an edit processing determination procedure executed by an event processing means.

The event processing means 2 executes the edit command transmission process at step S5 according to a procedure shown in FIG. 7.

When receiving the display command event, the event processing means 2 inquires of the scene definition means 6 what the current scene is, and gets the current scene information and the information indicating whether or not new insertion is enabled, read by the scene inquiry processing section 18 from the current scene storage section 17 and the scene storage section 16 at step S21. The event processing means 2 determines whether or not the edit command event is a new insertion command at step S22 and if it is a new insertion command, determines whether or not new insertion of document area is enabled based on the information gotten from the scene definition means 6 at step S23.

As a result of the determination, if new insertion is disabled, the event processing means 2 terminates the process; if new insertion is enabled, the event processing means 2 transmits an edit command to the edit processing means 4 at step S27 for commanding the edit processing means 4 to add the object area to document data stored in the main storage 8.

If the edit command event is not a new insertion command at step S22, the event processing means 2 specifies the object area and inquires of the role definition means 5 what the role is, then gets the role information corresponding to the area from the role inquiry processing means 15 that gets it from the role storage section 13 at step S24.

Next, the event processing means 2 passes the current scene information and the role information of the object area to the operation definition means 7 and inquires what the edit control method for the area is, then gets the operation information about edit control from the operation inquiry processing means 20 that gets it from the operation storage section 19 at step S25.

Next, the event processing means 2 determines whether or not the gotten operation information indicates that edit processing is enabled at step S26 and if so, transmits an edit command to the edit processing means 4 at step S27 for commanding the edit processing means 4 to perform edit processing for adding the object area to document data stored in the main storage 8.

Figure 8:
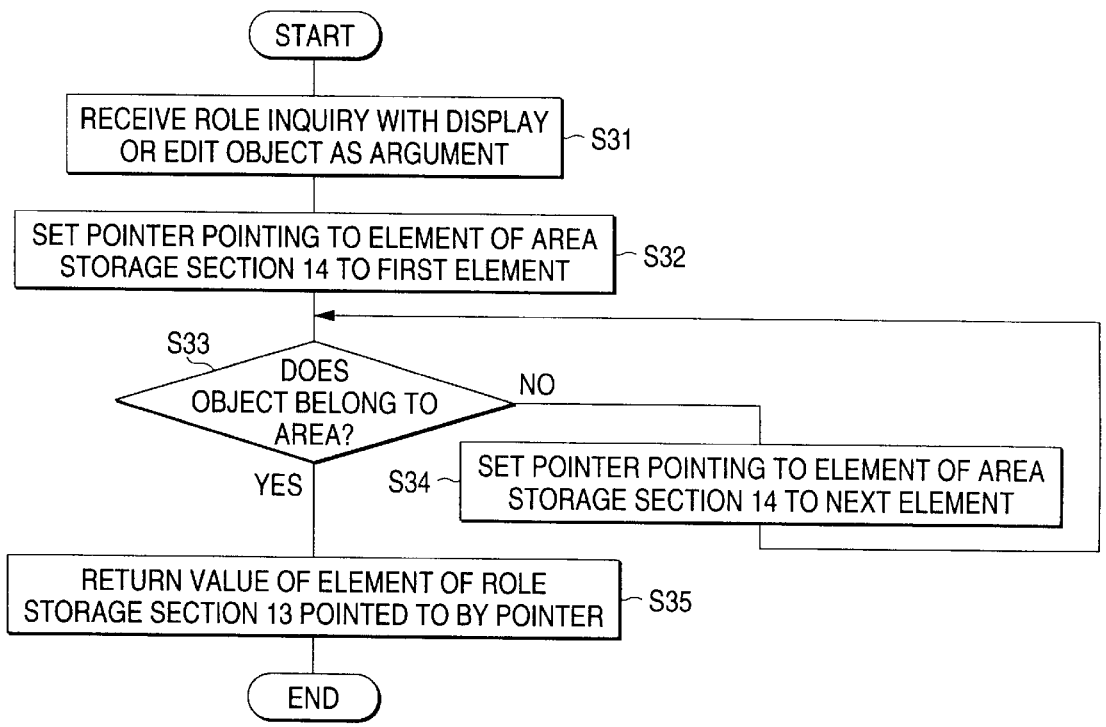
FIG. 8 is a flowchart showing a process procedure executed by a role inquiry processing section.

FIG. 8 shows a process procedure of the role inquiry processing section 15 in response to the inquiry described above.

When receiving a role inquiry from the event processing means 2 with the display or edit object area as an argument at step S31, the role inquiry processing section 15 sets a pointer pointing to an element of the area storage section 14 to the first element at step S32.

Next, the role inquiry processing section 15 determines whether or not the process object belongs to the area pointed to by the pointer at step S33 and if it does not belong to the area, sets the pointer pointing to the element of the area storage section 14 to the next element at step S34 for repeating determination as to whether or not the process object belongs to the area pointed to by the pointer. As a result, if the process object belongs to the area pointed to by the pointer, the role inquiry processing section 15 returns the value of the element of the area storage section 14 pointed to by the pointer to the event processing section 2 and terminates the process at step S35.

Figure 9:
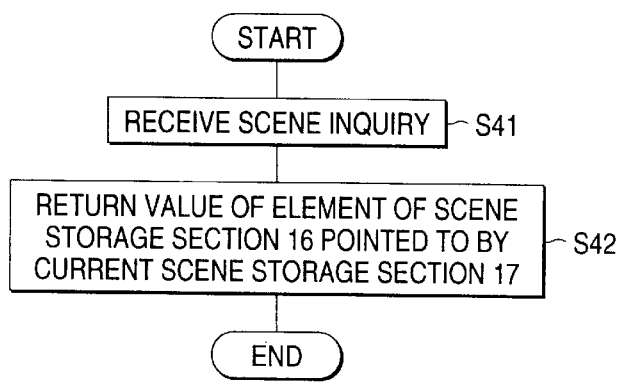
FIG. 9 is a flowchart showing a process procedure executed by a scene inquiry processing section.

FIG. 9 shows a process procedure of the scene inquiry processing section 18 in response to the inquiry described above.

When receiving an inquiry about the current scene from the event processing means 2 at step S41, the scene inquiry processing section 18 reads the value of the element of the scene storage section 16 pointed to by the value stored in the current scene storage section 17 and returns the value of the element to the event processing means 2 and terminates the process at step S42.

Figure 10:
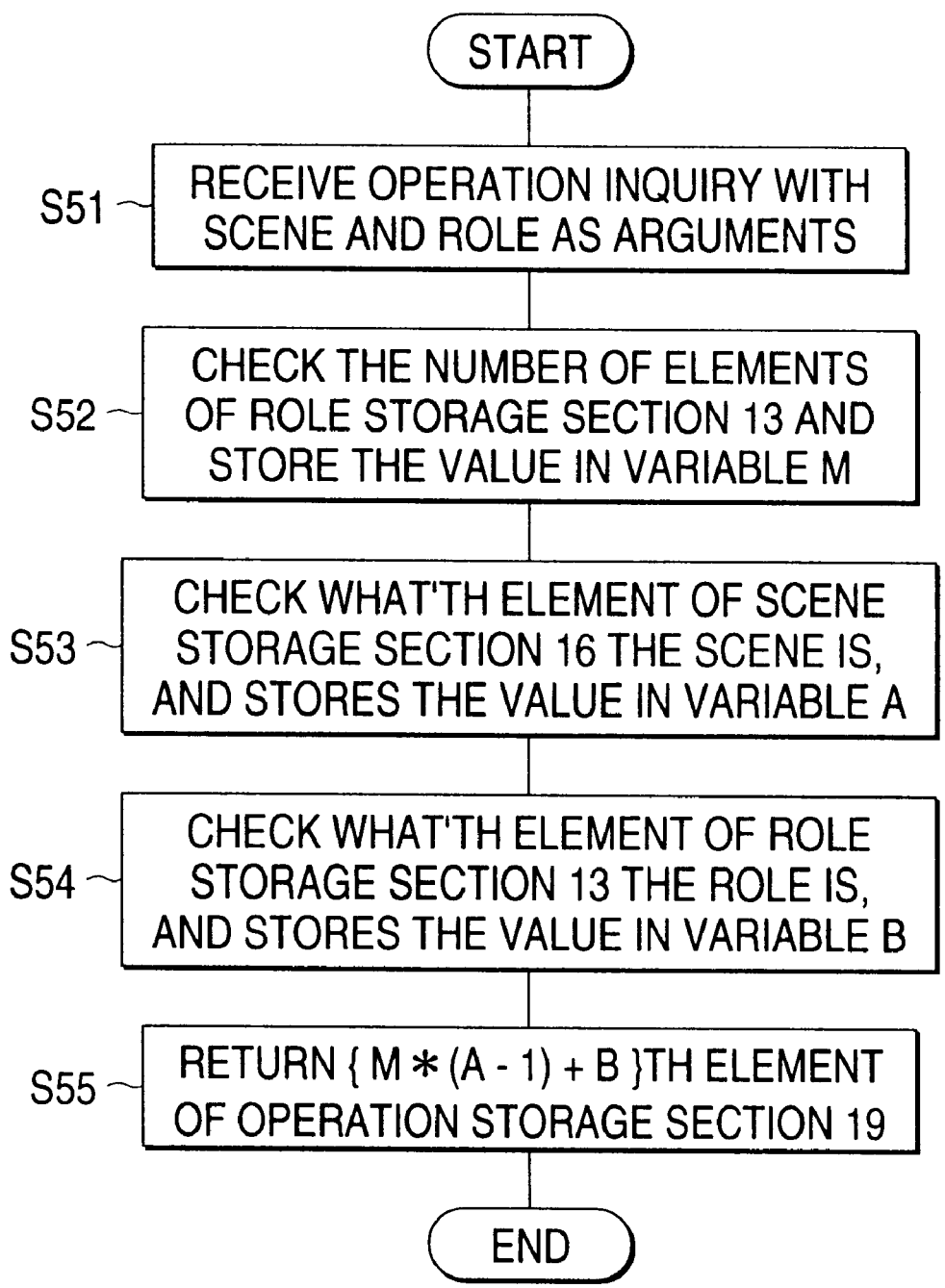
FIG. 10 is a flowchart showing a process procedure executed by an operation inquiry processing section.

FIG. 10 shows a process procedure for the operation inquiry processing section 20 in response to the inquiry described above.

When receiving an operation inquiry from the event processing means 2 with the scene and role as arguments at step S51, the operation inquiry processing section 20 checks the number of elements of the role storage section 13 and holds the value M at step S52. It checks what the element of the scene storage section 16 for the received scene is, and holds the value A at step S53. It further checks what the element of the role storage section 13 for the received role is, and holds the value B at step S54.

Next, based on the values, the operation inquiry processing section 20 reads the {M*(A−1)+B}th element stored in the operation storage section 19 and returns the value of the element to the event processing means 2, and then terminates the process at step S55. That is, the operation inquiry processing section 20 reads the operation information corresponding to the scene and role received from the event processing means 2 from the operation storage section 19 and returns it to the event processing means 2.

As described above, when the user enters a display or edit command event specifying one document area through the input section 10 by clicking on a document displayed on the display screen of the display 11, the event processing means 2 gets the corresponding role and scene from the role definition means 5 and the scene definition means 6 and further gets information indicating whether or not display or edit processing is enabled from the operation definition means 7 based on the role and scene. Based on the information indicating whether or not display or edit processing is enabled, the event processing means 2 transmits a command to the display processing means 3 or the edit processing means 4 and if display or edit processing is disabled, inhibits the event application area from being displayed or edited.

Operation control information corresponding to roles and scenes and pairs thereof is preset for disabling display or edit, whereby display or edit processing is automatically regulated in response to the role of the document area to which the event is applied or the event entering situation (scene), preventing an unexpected accident in which the document area is displayed or edited accidentally by the user.

Further, in the embodiment, information indicating whether or not new insertion of document area is enabled is preset for automatically regulating new insertion processing in response to the event entering situation; from this point, an unexpected accident in which the document area is edited by erroneous operation of the user is also prevented.

Next, the concept of the function of the document processing system of the embodiment will be discussed using specific examples.

Figures 11, 12:
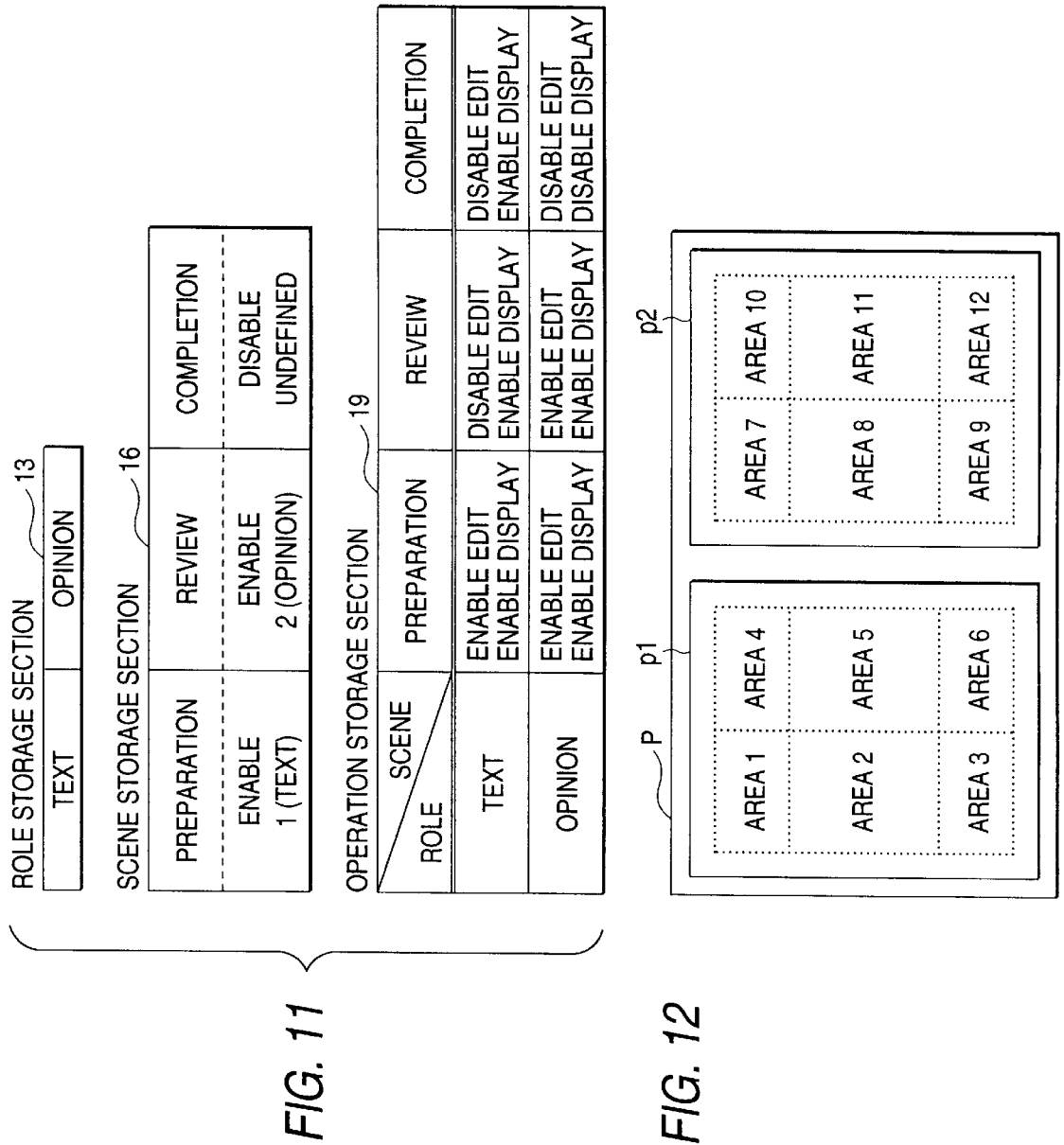
FIG. 11 is an illustration showing an example of the storage contents of a role storage section, a scene storage section, and an operation storage section.
FIG. 12 is an illustration showing areas into which document pages are divided.

FIG. 11 shows an example for explaining that edit or display processing can be regulated without difficulty even if the area that the same user is enabled to edit or display varies depending on the situation, wherein specifications of one product are prepared. To prepare the specifications, the following steps are repeated: A draft (first draft) is prepared and distributed to reviewers (colleagues and related departments) for entering corrections in opinion area, and the text area is rewritten as the second draft reflecting the opinion. In the review phase, the specifications writer is also contained in the reviewers.

As shown in FIG. 11, "text" of the functional specifications and "opinion", comment by the reviewer, are defined as area roles in the role storage section 13. "Preparation," functional specifications preparation phase, "review," opinion collection phase, and "completion" after the end of preparation are defined as scenes in the scene storage section 16. In the "preparation" scene, new insertion of characters and graphics is allowed and the role of a newly inserted area becomes "text" as the default value. Also in the "review" scene, new insertion is allowed and the role of a newly inserted area becomes "opinion" as the default value. However, in the "completion" scene, new insertion is disabled.

In the operation storage section 19, both edit and display are enabled for all areas in the "preparation" scene, edit of the area having the role "text" is disabled in the "review" scene, and all edits are disabled in the "completion" scene and display of only areas having the role "text" is enabled.

Under the definitions, in the preparation phase, the "current scene" in the current scene storage section 17 becomes "preparation" wherein the writer edits the document as desired, and in the review phase, the "current scene" is set to "review", wherein the document is distributed to the reviewers. As a result, edit of the document as text is disabled and the writer can enter comments regarding his or her opinion freely without changing the text in error as a reviewer. When such preparation and review are repeated to complete the specifications, the "current scene" is set to "completion," all edits of the document are disabled, and the completed specifications is displayed with only the text on the display screen.

FIG. 13 shows an example for explaining that edit or display processing can be regulated without difficulty even if the area that a number of users are enabled to edit or display is duplicated, wherein consultation is circulated. This consultation is circulated in the order of from a planning department to a general affairs department to executives, where the general affairs department has duties of making an entry in the areas related to the general affairs department and correcting miswritten characters and missing letters found in the contents entered by the planning department.

As shown in FIG. 12, consultation P consists of two pages of p1 and p2; the first page p1 has six areas of areas 1–6 and the second page p2 has six area of areas 7–12. That is, the consultation P has 12 areas of areas 1–12.

As shown in FIG. 13, "background" representing an entry area header and "planning," "general affairs," and "executives" representing entry areas of persons who enter comments are defined as roles in the role storage section 13. The following are defined in the area storage section 14: The areas having the role "background" are areas 1–3 and 7–9, those having the role "planning" are areas 4 and 5, those having the role "general affairs" are areas 6 and 10, and those having the role "executives" are areas 11 and 12.

Five scenes of "form preparation," consultation form preparation phase, "planning entry," entering phase by the planning department, "general affairs entry" entering phase by the general affairs department, "executive entry," entering phase by the executives, and "approval end" after the approval end are defined in the scene storage section 16. Definitions that new insertion is allowed only in the "form preparation" scene and that the default value of the role of a new insertion area is "background" are made in the scene storage section 16.

In the operation storage section 19, edit of all areas is enabled in the "form preparation" scene, edit of the areas having the role "planning" is enabled in the "planning entry" scene, edit of the areas having the role "general affairs" or "planning" is enabled in the "general affairs entry" scene, edit of the areas having the role "executives" is enabled in the "executive entry" scene, and edit of all areas is disabled in the "approval end" scene. Display of all areas in all scenes is enabled.

Under the definitions, in the consultation form preparation phase, the "current scene" in the current scene storage section 17 becomes "form preparation" wherein the writer edits and makes new insertion of area as desired for preparing the form of the consultation P. In the planning department phase, the "current scene" becomes "planning entry" wherein the user edits only the areas 4 and 5 having the role "planning" as desired. In the general affairs department phase, the "current scene" becomes "general affairs entry" wherein the user can enter comments in the areas 6 and 10 having the role "general affairs" and correct miswritten characters and missing characters in the areas having the "planning." Further, in the executive phase, the "current scene" becomes "executive entry" wherein the user edits only the areas 11 and 12 having the role "executives" as desired. When such an edit process is repeated and the consultation is approved, the "current scene" is set to "approval end." All edits of the consultation P are disabled and all areas 1–12 of the consultation P are displayed on the display screen.

Next, a document processing system according to a second embodiment of the invention will be discussed.

The embodiment uses passwords to identify predetermined users for providing the effect of security in addition to prevention of erroneous operation. Parts identical with or similar to those previously described in the first embodiment will not be discussed again. The entire configuration of the document processing system is similar to that shown in FIG. 1 and the configurations of role definition means 5 and operation definition means 7 are also similar to those shown in FIGS. 2 and 4.

Figure 14:
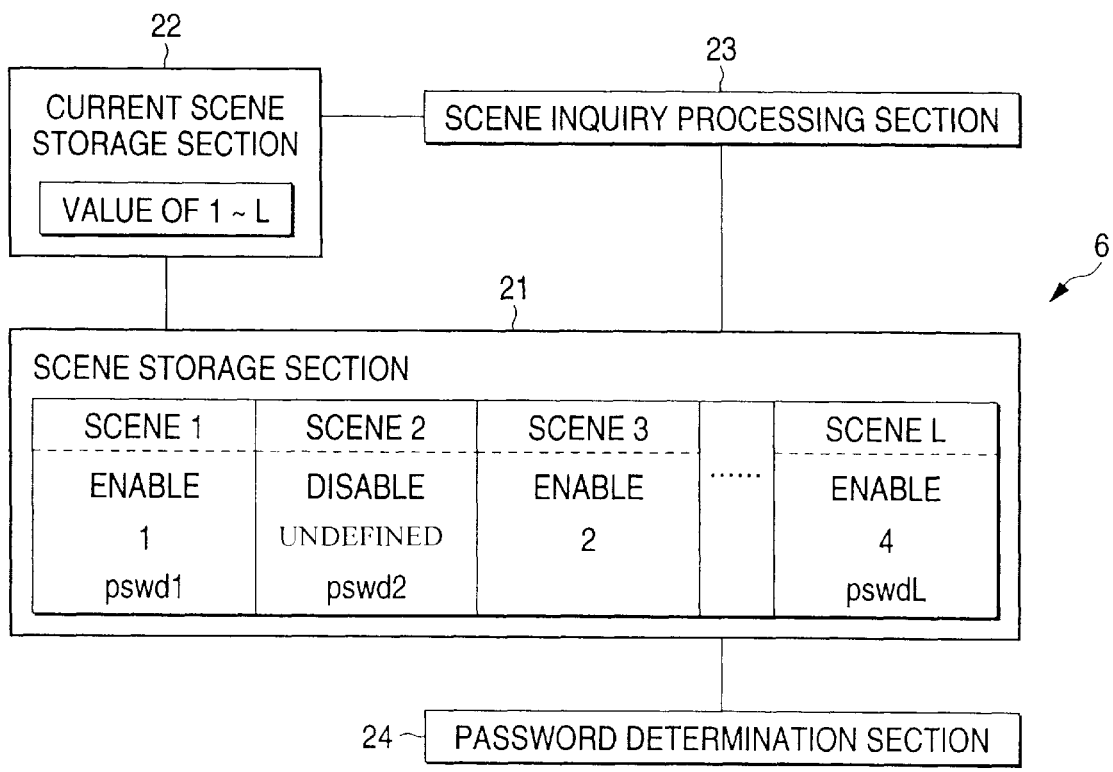
FIG. 14 is a conceptual drawing showing the configuration of a scene definition means according to a second embodiment of the invention.

Unlike the scene definition means in the first embodiment, scene definition means 6 in the second embodiment comprises a password determination section 24 for determining a password entered by the user in addition to a scene storage section 21, a current scene storage section 22, and a scene inquiry processing section 23, as shown in FIG. 14.

The scene storage section 21 provides a variable-length array consisting of L elements each containing definitions of a scene (1-L) and information indicating whether or not new insertion is enabled as in the first embodiment and a password pawd (1-L). The current scene storage section 22 and the scene inquiry processing section 23 are the same as the current scene storage section 17 and the scene inquiry processing section 18 in the first embodiment.

The password determination section 24 can prompt the user to enter a password together with the current scene and collate the password of each scene set in the scene storage section 21 with the password entered by the user for determining whether or not the user-entered password is valid.

Figure 15:
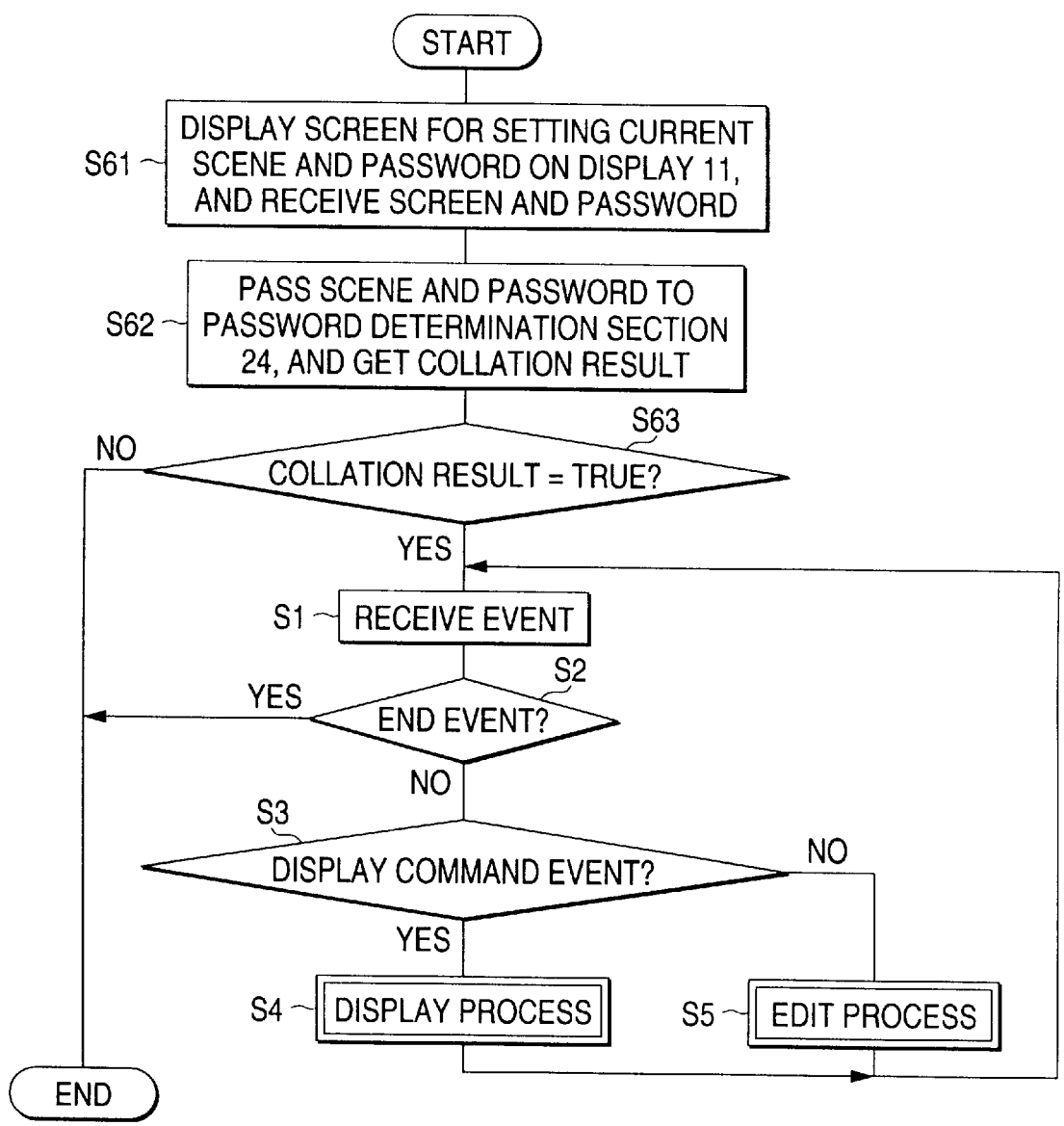
FIG. 15 is a flowchart showing a main process procedure executed by an event processing means according to the second embodiment of the invention.

As shown in FIG. 15, when the document processing system is started, the event processing means 2 displays a message for prompting the user to specify the current scene and enter a password on a display 11, and receives the current scene and password entered through an input section 10 at step S61. Then, it passes the entered scene and password to the password determination section 24, and gets the determination result from the password determination section 24 at step S62. If the determination result is false, the process is terminated; if the determination result is true, the same process as in the first embodiment shown in FIG. 5 (steps 1–5) is executed.

Figure 16:
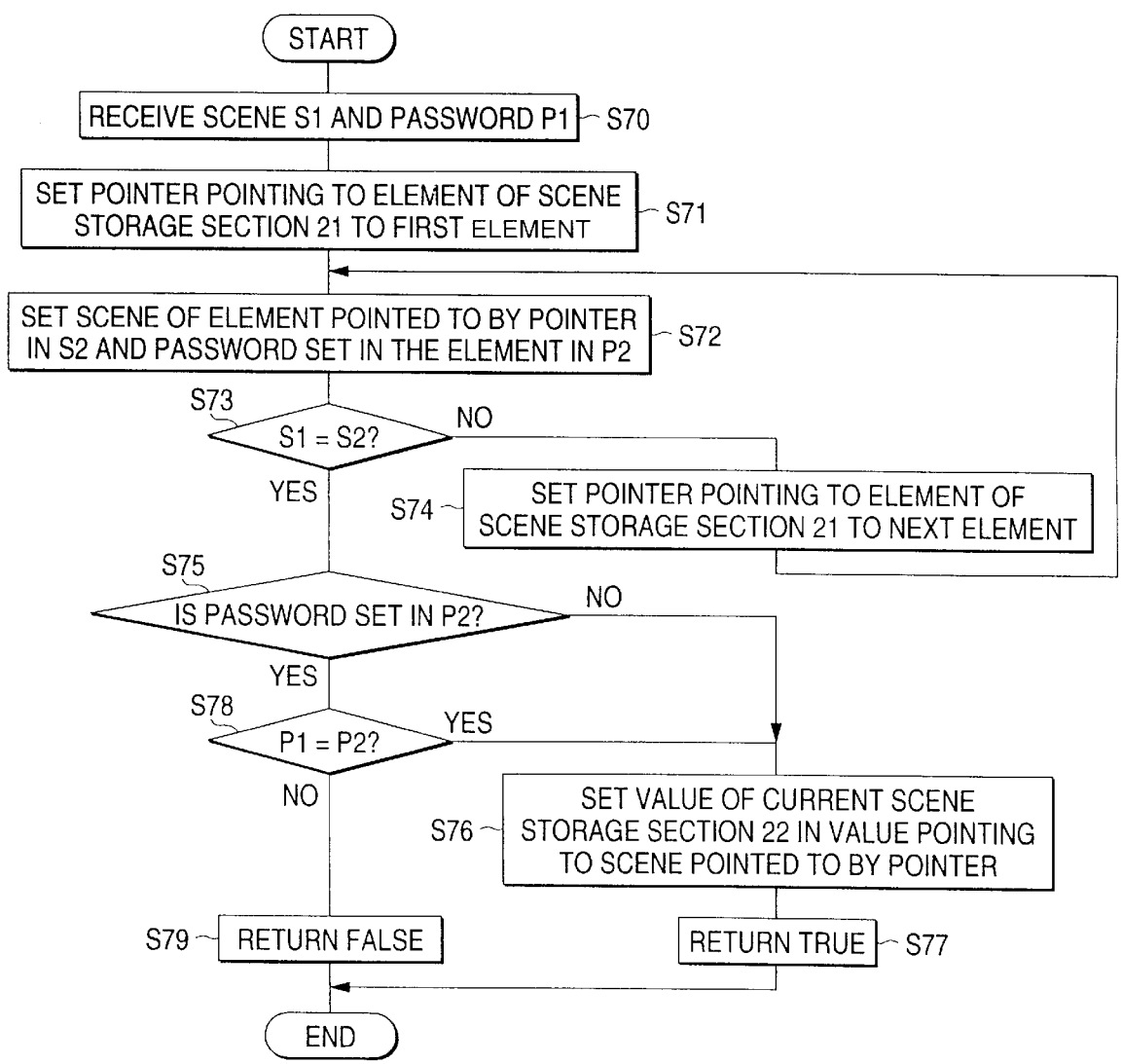
FIG. 16 is a flowchart showing a process procedure of a password determination section according to the second embodiment of the invention.

FIG. 16 shows a procedure of the determination process (step S63) executed by the password determination section 24.

First, when receiving a scene S1 and a password P1 entered through the input section 10 at step S70, the password determination section 24 sets a pointer pointing to an element of the scene storage section 21 to the first element at step S71, holds the scene of the element pointed to by the pointer as a variable S2, and sets the password set in the element as a variable P2 at step S72.

The password determination section 24 determines whether or not the scenes S1 and S2 are the same at step S73 and if they are not the same, sets the pointer to the next element of the scene storage section 21 for repeating the process at step S74.

On the other hand, if the scenes S1 and S2 are the same, the password determination section 24 determines whether or not a password is set in P2 at step S75 and if it is not set, sets the value pointing to the scene pointed to by the pointer in the value of the current scene storage section 22 at step S76 because it is not a password setting area. Then, the password determination section 24 returns the determination result "true" to the event processing means 2 from the scene inquiry processing section 23, and terminates the process at step 77.

On the other hand, if a password is set in P2, the password determination section 24 determines if the passwords in P1 and P2 match at step S78 and if they match, sets the value of the current scene storage section 22 in the value pointing to the scene pointed to by the pointer, returns the determination result "true" to the event processing means 2, and terminates the process at step S77; if they do not match, the password determination section 24 returns the determination result "false" to the event processing means 2 and terminates the process at step S79.

Therefore, the document processing system of the second embodiment performs edit or display processing only when the user-entered password matches a password set in the scene storage section 21. As such, it can prevent an unexpected accident from occurring in which a document is modified by erroneous operation, and provide security for documents by password collation.

Since passwords are set for scenes, password setting operation is simplified as compared with conventional systems in which passwords are set for areas. To use a document, the user needs only to enter a password once at the beginning, so that operation is simplified as compared with operation of entering a password for each area.

Next, a document processing system according to a third embodiment of the invention will be discussed.

The embodiment assigns user identifiers and group identifiers to users for obtaining access in order to provide security in addition to prevention of erroneous operation. Parts identical with or similar to those previously described in the first embodiment will not be discussed again. The entire configuration of the document processing system is similar to that shown in FIG. 1 and the configurations of role definition means 5 and operation definition means 7 are also similar to those shown in FIGS. 2 and 4.

Figure 17:
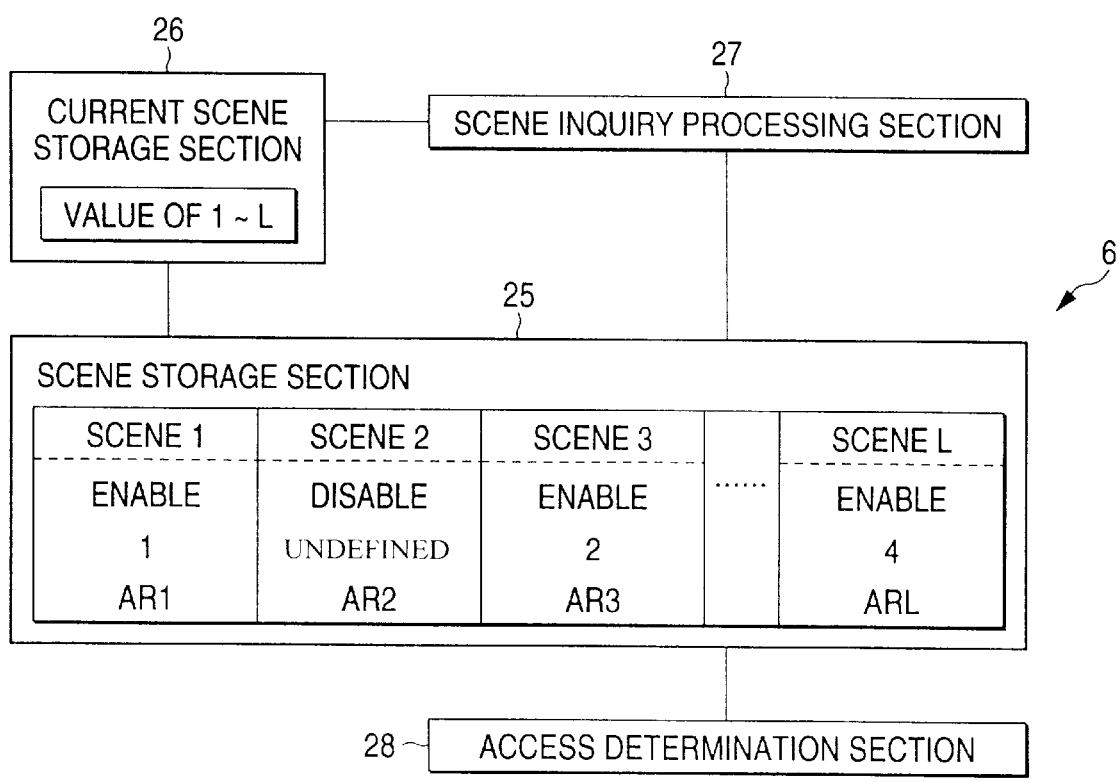
FIG. 17 is a conceptual drawing showing the configuration of a scene definition means according to a third embodiment of the invention.

Unlike the scene definition means in the first embodiment, scene definition means 6 in the third embodiment comprises an access determination section 28 for determining access of the user or user group in addition to a scene storage section 25, a current scene storage section 26, and a scene inquiry processing section 27, as shown in FIG. 17.

The scene storage section 25 provides a variable-length array consisting of L elements each containing definitions of a scene (1-L) and information indicating whether or not new insertion is enabled as in the first embodiment, and an access definition (AR1–ARL). The access definitions are stored as a variable-length array with a user identifier or user group identifier as an element; the array length is 0 or 1 or more and the length 0 means that access is not limited. The current scene storage section 26 and the scene inquiry processing section 27 are the same as the current scene storage section 17 and the scene inquiry processing section 18 in the first embodiment.

The access determination section 28 can determine whether or not the user has access.

Figure 18:
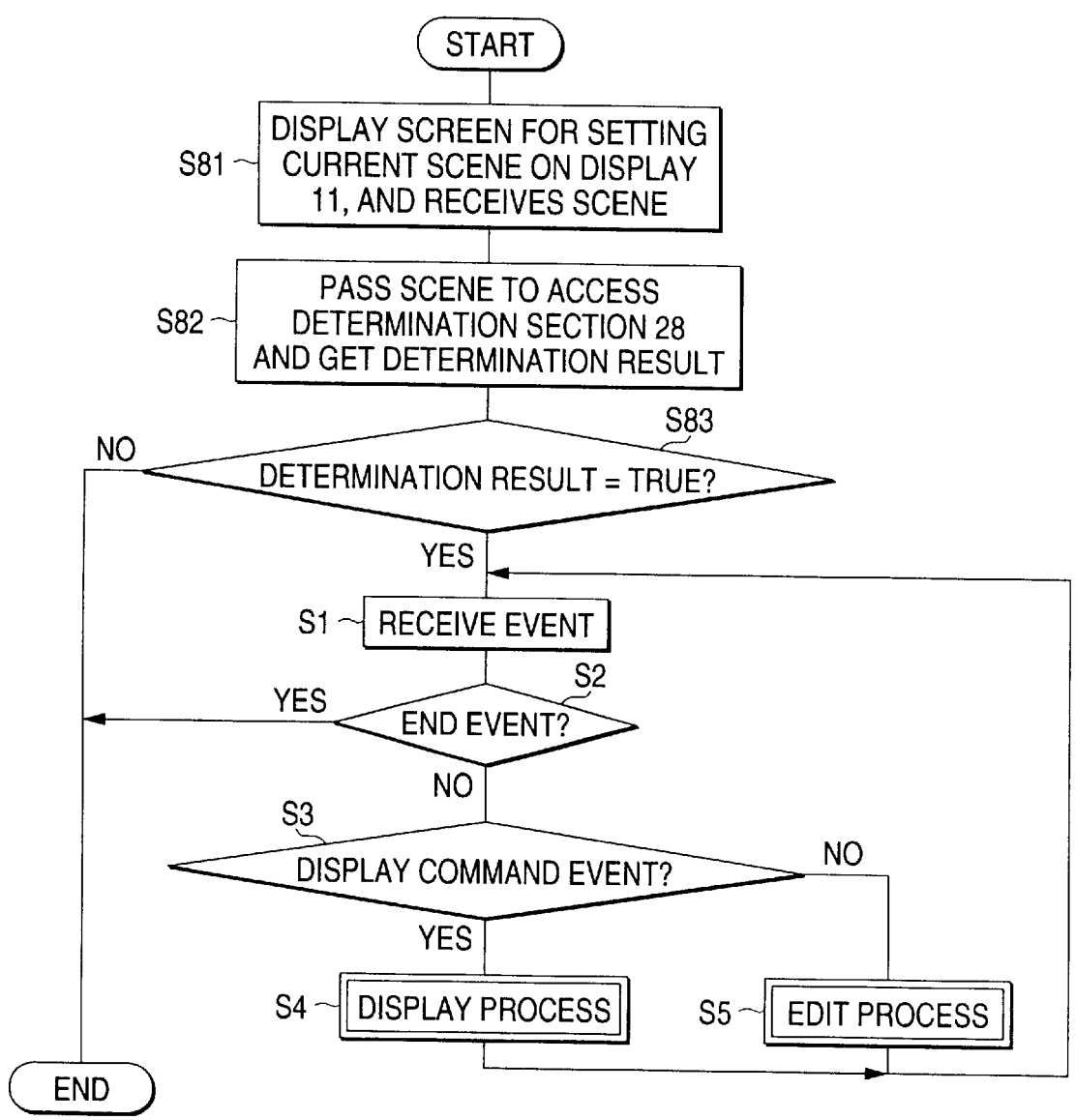
FIG. 18 is a flowchart showing a main process procedure executed by an event processing means according to the third embodiment of the invention.

As shown in FIG. 18, when the document processing system is started, the event processing means 2 displays a message for prompting the user to specify the current scene on a display 11, and receives information on the scene selected by the user at step S81. Then, it passes the received scene to the access determination section 28, and gets the determination result from the access determination section 28 at step S82. If the determination result is false, the process is terminated; if the determination result is true, the same process as in the first embodiment shown in FIG. 5 (steps 1–5) is executed.

Figure 19:
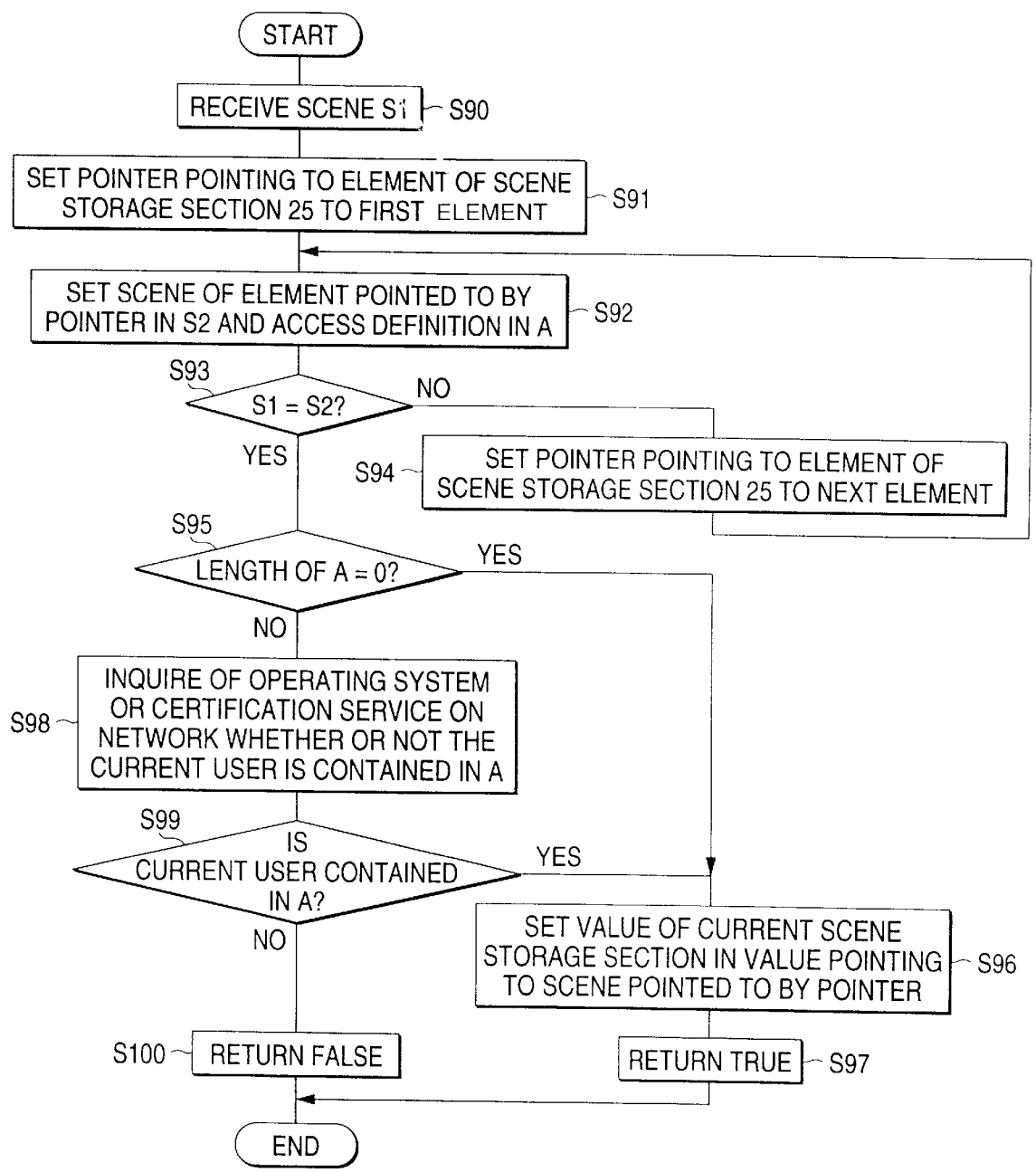
FIG. 19 is a flowchart showing a process procedure of a password determination section according to the third embodiment of the invention.

FIG. 19 shows a procedure of the determination process (step S82) executed by the access determination section 28.

First, when receiving a scene S1 selected through the input section 10 at step S90, the access determination section 28 sets a pointer pointing to an element of the scene storage section 25 to the first element at step S91. Next, it sets the scene of the element pointed to by the pointer in a variable S2 and the access definition in a variable A at step S93, and determines whether or not the scenes S1 and S2 are the same at step S93.

If they are not the same, the access determination section 28 sets the pointer to the next element of the scene storage section 25 for repeating the process at step S94. On the other hand, if the scenes S1 and S2 are the same, the access determination section 28 determines whether or not the length of variable A is 0 at step S95 and if it is 0, sets the value of the current scene storage section 26 in the value of the scene pointed to by the pointer at step S96 because access is not regulated. Then, the access determination section 28 returns the determination result "true" to the event processing means 2 from the scene inquiry processing section 27, and terminates the process at step 97.

On the other hand, if the length of variable A is 1 or more, the access determination section 28 inquires of the operating system or certification service on the network whether or not the current user is contained in the user identifier or group identifier of the access definition A at step S98. If the current user is contained in the identifier at step 99, the access determination section 28 sets the value of the current scene storage section 26 in the value of the scene pointed to by the pointer at step S96, returns the determination result "true" to the event processing means 2 from the scene inquiry processing section 27, and terminates the process at step S97; if the current user is not contained in the identifier, the access determination section 28 returns the determination result "false" to the event processing means 2 from the scene inquiry processing section 27 and terminates the process at step S100.

Therefore, the document processing system of the third embodiment performs edit or display processing according to access in which authorization is granted to the user or user group. As such, it can prevent an unexpected accident from occurring in which a document is accidentally modified, and provide security for documents by access determination.

Since user identifiers and group identifiers are set for scenes, identifier setting operation is simplified as compared with conventional systems in which identifiers are set for areas. To use a document, an access determination process needs only to be executed once at the beginning, so that processing is simplified as compared with processing of executing an access certification process for each area, reducing consumption of computer resources and shortening the user wait time as compared with the prior art.

Although areas set in a document are used as objects in the first to third embodiments, the invention can also be applied so as to regulate display or edit processing in page units of a document.

As discussed in detail, the document processing system of the invention can reliably prevent the user from accidentally modifying a document or impairing security of a document.

That is, since the document processing system of the first aspect of the invention automatically determines whether or not display or edit processing is enabled based on preset roles and scenes, if there are a plurality of documents or areas whose edit or display is regulated for the user, the system enables easy setting concerning the regulation and the user to perform easy operation in using. If a document or area whose edit or display regulation for a user changes depending on the situation, the document processing system enables easy regulation setting and user operation. Further, if a document or area whose edit or display is regulated for a plurality of users is partially duplicated, the document processing system enables easy regulation setting and user operation.

The document processing system of the second aspect of the invention also sets information indicating whether or not new insertion is enabled in relation to each scene, thus enabling easy regulation setting while inserting a new document page or area in addition to easy user operation.

The document processing system of the third aspect of the invention uses user identification information such as passwords or identifiers to identify the user, thus reliably providing security for editing or displaying document data.

What is claimed is:

1. A system for performing document processing such as editing and displaying document data, said system comprising:

means for inputting document processing information;

role definition means for storing a plurality of preset document roles, each related to an area within the document;

scene definition means for storing a plurality of preset document processing scenes;

operation definition means for storing information indicating whether or not document processing is enabled for a role and a corresponding scene;

event processing means comprising
- means for getting a role corresponding to a document to be processed from said role definition means,
- means for getting the corresponding scene from said scene definition means based on the input document processing information, and
- means for getting information indicating whether or not the corresponding document processing is enabled from said operation definition means, and
- means for inquiring of the role definition means the role information for an area; and means for executing document processing based on the information indicating whether or not the document processing is enabled, gotten by said event processing means.

2. The document processing system as claimed in claim 1, wherein said document processing means performs document edit processing, wherein said scene definition means stores information indicating if insertion of a document is enabled corresponding to each scene, and wherein said event processing means also gets the information indicating if insertion is enabled from said scene definition means for controlling insertion of a document by said document processing means.

3. The document processing system as claimed in claim 1, wherein user identification information is also entered through said input means, wherein said scene definition means stores user identification information corresponding to each scene, and wherein said event processing means determines whether or not the user identification information gotten from said scene definition means matches the user identification information entered through said input means for controlling document processing by said document processing means.

4. The document processing system as claimed in claim 2, wherein user identification information is also entered through said input means, wherein said scene definition means stores user identification information corresponding to each scene, and wherein said event processing means determines whether or not the user identification information gotten from said scene definition means matches the user identification information entered through said input means for controlling document processing by said document processing means.

* * * * *